US011080727B1

(12) United States Patent
Novak et al.

(10) Patent No.: US 11,080,727 B1
(45) Date of Patent: Aug. 3, 2021

(54) GLOBAL OPTIMIZATION OF INVENTORY ALLOCATION

(71) Applicant: Stitch Fix, Inc., San Francisco, CA (US)

(72) Inventors: Gregory Novak, San Francisco, CA (US); Bradley J. Klingenberg, San Mateo, CA (US); Mark Dijkstra, San Francisco, CA (US); Ramesh O. Johari, Burlingame, CA (US)

(73) Assignee: Stitch Fix, Inc., San Francisco, CA (US)

( * ) Notice: Subject to any disclaimer, the term of this patent is extended or adjusted under 35 U.S.C. 154(b) by 97 days.

(21) Appl. No.: 16/216,442

(22) Filed: Dec. 11, 2018

(51) Int. Cl.
*G06Q 30/02* (2012.01)
*G06N 20/00* (2019.01)

(52) U.S. Cl.
CPC ......... *G06Q 30/0202* (2013.01); *G06N 20/00* (2019.01)

(58) Field of Classification Search
None
See application file for complete search history.

(56) References Cited

U.S. PATENT DOCUMENTS 8,068,676 B2 * 11/2011 Zhang ................. G06Q 30/0631
382/224
8,386,486 B2 * 2/2013 Zhang .................... G06Q 30/02
707/737

(Continued)

FOREIGN PATENT DOCUMENTS

WO WO-2010019925 A1 * 2/2010 ............... G06T 7/75
WO WO-2011152844 A1 * 12/2011 ........... G06K 9/6256

(Continued)

OTHER PUBLICATIONS

Karessli, Nour, Romain Guigourès, and Reza Shirvany. "Sizenet: Weakly supervised learning of visual size and fit in fashion images." Proceedings of the IEEE/CVF Conference on Computer Vision and Pattern Recognition Workshops. 2019. (Year: 2019).*

(Continued)

*Primary Examiner* — Matthew S Gart
*Assistant Examiner* — Derick J Holzmacher
(74) *Attorney, Agent, or Firm* — Van Pelt, Yi & James LLP

(57) ABSTRACT

An article type adjustment approximation value for each physical article type of a plurality of physical article types of limited quantities is predetermined. A determination is made to assign to a selected client among a set of clients, a set of physical article types among the plurality of physical article types. A group of eligible physical article types for the selected client among the plurality of physical article types is identified. Using one or more machine learning prediction models, a desirability prediction value for each physical article type in the group of eligible physical article types is determined. The desirability prediction values are adjusted using the corresponding predetermined article type adjustment approximation value and a corresponding predetermined client adjustment approximation value to determine corresponding adjusted prediction values. The corresponding adjusted prediction values are used to determine the set of physical article types to be assigned to the selected client.

17 Claims, 9 Drawing Sheets

(56) References Cited

U.S. PATENT DOCUMENTS

| | | | | |
|---|---|---|---|---|
| 8,700,443 | B1* | 4/2014 | Murray | G06Q 10/06315 |
| | | | | 705/7.31 |
| 8,898,169 | B2* | 11/2014 | Gokturk | G06Q 30/0278 |
| | | | | 707/740 |
| 8,983,142 | B1* | 3/2015 | Zhang | G06F 16/954 |
| | | | | 382/111 |
| 9,025,864 | B2* | 5/2015 | Zhang | G06K 9/6256 |
| | | | | 382/159 |
| 9,805,402 | B1* | 10/2017 | Maurer | G06Q 10/087 |
| 2004/0049309 | A1* | 3/2004 | Gardner | G06T 17/00 |
| | | | | 700/132 |
| 2010/0111370 | A1* | 5/2010 | Black | G06K 9/00369 |
| | | | | 382/111 |
| 2014/0257928 | A1* | 9/2014 | Chen | G06Q 30/0202 |
| | | | | 705/7.31 |
| 2016/0292011 | A1* | 10/2016 | Colson | G06Q 10/06311 |
| 2016/0292769 | A1* | 10/2016 | Colson | G06Q 10/087 |
| 2017/0004567 | A1* | 1/2017 | Dutt | G06Q 30/0643 |
| 2017/0018117 | A1* | 1/2017 | Chen | G06T 17/205 |
| 2017/0076011 | A1* | 3/2017 | Gannon | G06F 16/5866 |
| 2017/0091844 | A1* | 3/2017 | Yarvis | G06Q 30/0631 |
| 2017/0255952 | A1* | 9/2017 | Zhang | G06Q 10/06395 |
| 2017/0316485 | A1* | 11/2017 | Magnusson | G06Q 30/0631 |
| 2018/0012158 | A1* | 1/2018 | Cholewinski | G06Q 10/087 |
| 2018/0053142 | A1* | 2/2018 | Martin | G06Q 10/087 |
| 2018/0137455 | A1* | 5/2018 | Mack | G06Q 10/04 |
| 2018/0218433 | A1* | 8/2018 | Penner | G06Q 30/0643 |
| 2018/0349795 | A1* | 12/2018 | Boyle | G06Q 10/067 |

FOREIGN PATENT DOCUMENTS

| | | | | | |
|---|---|---|---|---|---|
| WO | WO-2012064893 | A2 * | 5/2012 | | G06Q 30/0278 |
| WO | WO-2017203262 | A2 * | 11/2017 | | G06K 9/00201 |

OTHER PUBLICATIONS

Cheng, Ching-I., and Damon Shing-Min Liu. "An intelligent clothes search system based on fashion styles." 2008 International Conference on Machine Learning and Cybernetics. vol. 3. IEEE, 2008. (Year: 2008).*

Kreyenhagen, C. David, et al. "Using supervised learning to classify clothing brand styles." 2014 Systems and Information Engineering Design Symposium (SIEDS). IEEE, 2014. (Year: 2014).*

Bossard, Lukas, et al. "Apparel classification with style." Asian conference on computer vision. Springer, Berlin, Heidelberg, 2012. (Year: 2012).*

Wang, Wenguan, et al. "Attentive fashion grammar network for fashion landmark detection and clothing category classification." Proceedings of the IEEE Conference on Computer Vision and Pattern Recognition. 2018. (Year: 2018).*

* cited by examiner

Let $S$ be the set available and qualified inventory
Let $\Delta$ be the step size
Set $\lambda_j^{(0)} = 0$ for $j = 1, \ldots, M$
Set $\eta_i^{(0)} = 0$ for $i = 1, \ldots, N$
for iterations $k = 1, \ldots, K$ do
   for customers $i = 1, \ldots, N$ do
      Solve for (at least approximately) the maximum global sum of adjusted desirability prediction values using $\lambda^{(k)}$ and $\eta^{(k)}$ to obtain $x_{ij}^{(k+1)}$
   end for
   for customers $i = 1, \ldots, N$ do
      $\eta_i^{(k+1)} = \eta_i^{(k)} + \Delta \cdot \left[ \sum_j x_{ij}^{(k+1)} - H \right]$
   end for
   for article types $j = 1, \ldots, M$ do
      $\lambda_j^{(k+1)} = \lambda_j^{(k)} + \Delta \cdot \left[ \sum_i x_{ij}^{(k+1)} - q_j \right]$
   end for
end for

FIG. 7

Let $S$ be the set available and qualified inventory
Let $\Delta$ be the step size
Set $\lambda_j^{(0)} = 0$ for $j = 1, \ldots, M$
Set $\eta_i^{(0)} = 0$ for $i = 1, \ldots, N$
for iterations $k = 1, \ldots, K$ do
   for article types $j = 1, \ldots, M$ do
      $\lambda_j^{(k+1)} = \lambda_j^{(k)} + \Delta \cdot \left[ \sum_i \mathbf{1}(p_{i,j} - \lambda_j^{(k)} - \eta_i^{(k)} > 0) - q_j \right]$
   end for
   for customers $i = 1, \ldots, N$ do
      $\eta_i^{(k+1)} = \eta_i^{(k)} + \Delta \cdot \left[ \sum_j \mathbf{1}(p_{i,j} - \lambda_j^{(k+1)} - \eta_i^{(k)} > 0) - H \right]$
   end for
end for

FIG. 8

Let $S$ be the set available and qualified inventory
Let $\Delta$ be the step size
Set $\lambda_j^{(0)} = 0$ for $j = 1, \ldots, M$
for iterations $k = 1, \ldots, K$ do
    for customers $i = 1, \ldots, N$ do
        Solve for (at least approximately) the maximum global sum of adjusted desirability prediction values using $\lambda^{(k)}$ to obtain $x_{ij}^{(k+1)}$
    end for
    for article types $j = 1, \ldots, M$ do
        $\lambda_j^{(k+1)} = \lambda_j^{(k)} + \Delta \cdot \left[ \sum_i x_{ij}^{(k+1)} - q_j \right]$
    end for
end for

GLOBAL OPTIMIZATION OF INVENTORY ALLOCATION

BACKGROUND OF THE INVENTION

Determining product suggestions for customers can be difficult. In particular, the success of product suggestions for clothing and similar fashion-related products can be dependent on at least the customer's style preferences, sizing, and available current and future inventory. For any group of potential customers, their style preferences and sizes can differ. Another important factor is that there are limited quantities for inventory. Once a product is suggested and made available to one customer, it is typically no longer available for any other customers. This can leave the remaining customers of the group with a poor set of product choices based on the remaining inventory. Therefore, it is desirable when determining the product suggestions for a group of customers to consider the global impact in selecting a given item for a given customer. There is a need to optimize product selections globally across a group of customers instead of locally for only one particular customer at a time.

BRIEF DESCRIPTION OF THE DRAWINGS

Various embodiments of the invention are disclosed in the following detailed description and the accompanying drawings.

FIG. 7 is a pseudo-code description illustrating an embodiment of a process for selecting adjustment approximation values.

FIG. 8 is a pseudo-code description illustrating an embodiment of a process for selecting adjustment approximation values.

FIG. 9 is a pseudo-code description illustrating an embodiment of a process for selecting adjustment approximation values.

DETAILED DESCRIPTION

Figure 1:
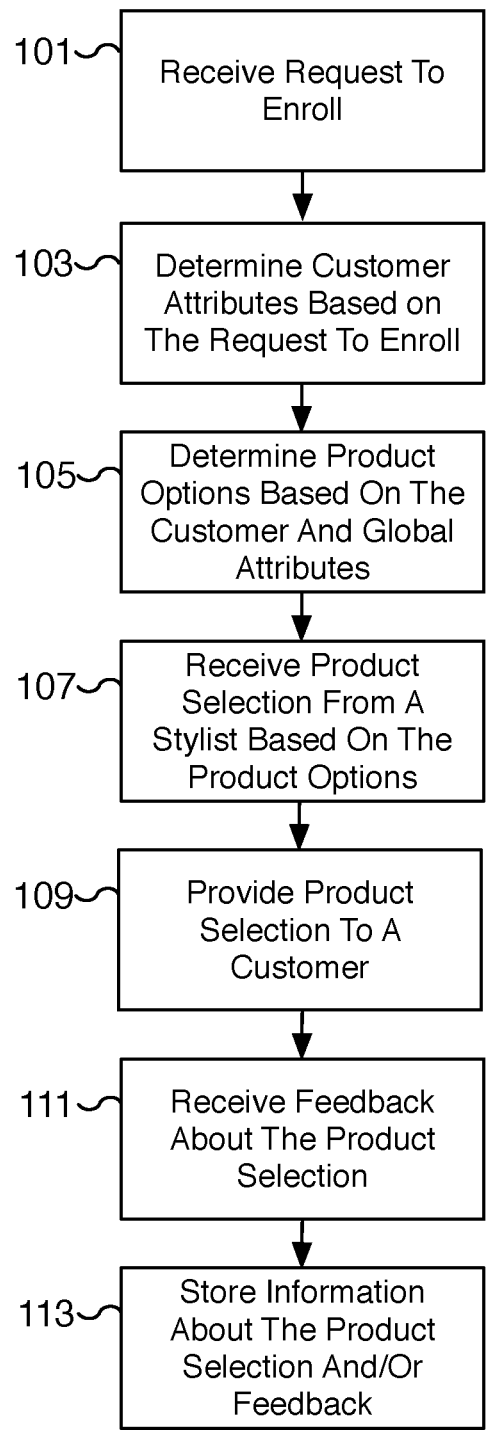
FIG. 1 is a flow chart illustrating an embodiment of a process for selecting and providing products.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A global optimization technique for inventory allocation is disclosed. When determining product suggestions for customers, the available inventory is fixed for a certain time period. When an item from available inventory is allocated to one customer, for example, as a product suggestion for purchase, that item is no longer available to all other customers. In determining how to allocate inventory amongst customers, a global optimization technique takes into account more than just the best possible match for any one particular customer. For example, a globally optimized solution can consider the needs of all customers during allocation of any one particular product or article type. The globally optimized solution can also take into account the current state of the inventory and/or future states of the inventory. For example, a particular dress is a good match for two customers. Before allocating the dress, the inventory state and other inventory choices available for both customers are considered. If the first customer has 10 other strong choices and the second customer has 100 other strong choices, then the dress should be allocated to the first customer. A globally optimized allocation takes into account all customers in the group. For example, for a group with more than two customers, in the event that all 10 of the first customer's strong choices are only good matches for the first customer and all 100 of the second customer's choices are all in very high demand by the remaining customers, then a globally optimized allocation may instead allocate the dress to the second customer. In this scenario, the first customer has 10 alternative strong choices all to herself. The second customer has the dress as a good match but competes with all remaining customers for her 100 other strong choices. The effective number of choices for the second customer is thus reduced by the demand from other customers. By taking into account global constraints, including constraints based on individual customer preferences, the disclosed techniques optimize the allocation of inventory across all customers.

In some embodiments, a global optimized allocation of inventory is determined by using desirability prediction values evaluated using one or more machine learning models. Global constraints are defined to ensure that inventory allocation takes into account a global perspective on the allocation. These constraints may include allocation constraints, average quality metric constraints, average match score constraints, variety constraints, pricing constraints, and viable assortment constraints, among others. In some embodiments, the constraints are approximated by adjustment approximation values. For example, adjustment approximation values are introduced to simplify the complexity of the constraints and in some cases may be used to decouple the global optimization across clients. Typically, a global optimization problem requires solving the optimization problem across all variables at the same time (e.g., for every user simultaneously). This is computationally expensive, taking a large amount of computing resources, and often impractical. Moreover, the computational resources increase and the time required to solve the problem increases exponentially as the number of customers and/or inventory article types increases. By decoupling the constraints across clients using computational adjustment approximation values, the problem size is vastly reduced and the global optimization problem is solvable. The disclosed optimizations allow for improved computing speed, reduced computing resource requirements, and the ability to decouple the problem across clients so that inventory allocation can be efficiently solved by a computer/server for each client as needed. As the number of clients and inventory types increases, the problem remains solvable using a limited amount of computing resources. In some embodiments, the adjustment approximation values are implemented using Lagrange multipliers and the global optimization is solved using a Lagrangian relaxation. Various techniques may be used to select optimal values or approximations for the adjustment approximation values. For example, an iterative sub-gradient process with a particular step size may be used to select adjustment approximation values for a group of customers and article types. In some embodiments, one or more global constraints may be relaxed and/or dropped to improve the speed of computing the inventory allocation. In some embodiments, the adjustment approximation values are re-selected at certain time intervals to ensure that they remain accurate approximations. As one example, the adjustment approximation values are re-selected at periodic intervals such as once a week.

In some embodiments, the selected adjustment approximation values may be used to inform inventory optimization, client analysis, and/or marketing. For example, certain adjustment approximation values provide indicators as to the relative value of different styles for current customers. Article types with high adjustment approximation values may be scarce (e.g., in high demand) and may be candidates for increasing their inventory quantities. In some embodiments, the adjustment approximation values are useful for marketing and client analysis. Certain adjustment approximation values, such as client-specific adjustment approximation values, indicate how well or poorly served a customer is by the current inventory and recommendation system. By identifying customers served in a limited manner by a current inventory (e.g., poorly served customers), modifications to inventory and/or the recommendation system can be made to improve the service they receive. For example, more items that match well with customers identified as poorly served can be stocked, designed and manufactured, and/or acquired. The inventory can be diversified to better address the needs of an identified segment of customers. As another example, customers that are valuable for the business can be analyzed to ensure that they are served well by being provided sufficient and quality product suggestions. The quality of the service for these customers can be evaluated by analyzing client-specific adjustment approximation values for that segment of customers.

In some embodiments, an article type adjustment approximation value is predetermined for each physical article type of a plurality of physical article types. The physical articles types have limited quantities. For example, the inventory for the current week corresponds to the physical articles that are available for the current week. It is useful to use a threshold time period for the inventory since inventory may be not restocked every day. In some scenarios, a threshold time period covers the weekend and/or when no restocking or processing of returns takes place. Based on the selected inventory period, an article type adjustment approximation value is then selected for each article type available. In some embodiments, the article type corresponds to a product of a specific style and size, for example, a particular style of blouse in size medium. The adjustment approximation value is selected to approximate a global constraint. In some embodiments, the article type adjustment approximation value can be interpreted as an adjustment value applied towards a customer for having access to a particular article type.

In some embodiments, a client adjustment approximation value is predetermined for each customer of a set of customers. For example, to optimize globally across a group of customers, the client adjustment approximation value is determined for the selected group of customers. The client adjustment approximation value is selected to approximate a global constraint. In some embodiments, the client adjustment approximation value can be interpreted as a customer-specific adjustment value. In various embodiments, the client is selected from a set of customers that are eligible for allocation from the inventory within a threshold time period. For example, using a threshold time period of one week, only customers eligible to receive product suggestions for the next week are used as the set of clients.

In some embodiments, a determination is made to assign to a selected client among the set of clients, a set of physical article types among the plurality of physical article types. For example, a particular client from a set of clients is targeted to receive a set of product suggestions to try on and consider for purchase. In some embodiments, the set of clients may be a subgroup of all customers, such as customers who are scheduled to receive new products in the coming week. Using a set of article types from inventory, product options are allocated for the selected client and made available for a reviewer (e.g., stylist assigned to the client) to choose from. The stylist selects a subset of the product options to create a set of product selections. The physical items corresponding to the product selections are shipped to the client to evaluate. Once the client acquires the physical items, she or he can try them on and evaluate the items in person. The client can decide whether each of the product suggestions fits well, matches her or his style, matches her or his current wardrobe, etc. The client can then decide whether or not to keep (and possibly purchase) one or more of these product suggestions. In some embodiments, the plurality of physical article types available in the inventory is used to select a set of article types for allocation to a selected customer or client. In some embodiments, an exact number of article types is made available to each client. For example, a determination is made that each eligible customer must be allocated exactly five article types. In some embodiments, the allocated articles must meet a minimum viable assortment constraint. For example, each eligible customer must be allocated good matches and not a particular number of matches. As another example, no one customer can be allocated all poor product suggestions at the expense of another customer being allocated product suggestions that are all extremely strong matches.

In some embodiments, a group of eligible physical article types is identified for the selected client among the plurality of physical article types. For example, items from inventory are identified for a customer from available inventory. In some embodiments, eligible inventory is based on a threshold time period, such as the inventory over the next four days. In some embodiments, a threshold time period is utilized instead of the current inventory to smooth out the inventory for better allocation results. In many cases, inventory cannot be realistically restocked continuously and returns may only be processed on certain days. For example, restocking and processing of returns may not be performed on weekends and/or may be subject to supply and delivery constraints. The result is an inventory that can fluctuate from day-to-day. By using a threshold time period to determine eligible inventory, a less fluctuating inventory of article types is used and can result in more accurate product suggestions across a group of customers. In some embodiments, the physical article types may be grouped by categories such as by women, men, and children (kids) categories. Subgroups of categories may also be used to determine eligibility. For example, clothing for women may include categories for petite, maternity, and plus sizing.

In some embodiments, using one or more machine learning prediction models, a desirability prediction value for each physical article type in the group of eligible physical article types is determined. In some embodiments, a trained machine learning model predicts the likelihood a particular article type is a strong match for a particular customer. A strong match indicates the customer would likely purchase or retain the item. For example, in the event the customer is provided an item to evaluate, a strong match indicates the customer will likely keep the item instead of returning it. In some scenarios, a customer only pays for the items the customer chooses to retain. In some embodiments, the desirability prediction values are match scores corresponding to a customer and article type pair. In various embodiments, the desirability prediction value takes into account the customer's style, sizing, pricing, and other preferences. Additional features of the article type and/or customers may be used to predict desirability. In some embodiments, one or more machine learning models are trained using data collected from customers' feedback; initial customer survey results on style, sizing, and fit; customer purchase and return history; and purchase and style trends (such as seasonal and/or fashion trends), among other input data. In some embodiments, the training data sets utilize sales history (including what products were purchased by which types of customers), product retention history (including what products were retained and not returned by which type of customers), and/or customer provided feedback. In various embodiments, the customer feedback can take many forms including feedback on styles, sizing, and fit (preferences and challenges), among others.

In some embodiments, the desirability prediction values are adjusted using the corresponding predetermined article type adjustment approximation value and the corresponding predetermined client adjustment approximation value to determine corresponding adjusted prediction values. For example, the adjustment approximation values are used to approximate global constraints and are used to determine adjusted prediction values from a global inventory allocation perspective. In some embodiments, the adjustment approximation values are approximated by Lagrange multipliers and are used to relax the global constraints to improve the efficiency of computing a globally optimized allocation of inventory. In various embodiments, the adjusted desirability prediction values correspond to the desirability prediction values subject to one or more approximated global constraints.

In some embodiments, the corresponding adjusted prediction values are used to determine the set of physical article types to be assigned to the selected client. By maximizing the global sum of the corresponding adjusted prediction values subject to the inventory and other remaining global constraints, an optimized global allocation of inventory can be determined. In some embodiments, a maximized global sum of adjusted prediction values based on inventory allocation corresponds to a global optimized inventory allocation. The set of articles assigned to the selected customer may then be used by a stylist to determine a final product selection for the customer. For example, the stylist is presented with the set of articles based on the inventory allocation and chooses from the set a group of particular items for the customer to try. In some embodiments, the group of items selected by the stylist may be selected based on how well the items match with one another.

FIG. 1 is a flow chart illustrating an embodiment of a process for selecting and providing products. In some embodiments, at least some of the products selected and provided to the customer may be products identified and/or allocated to the customer according to the processes described herein. The process of FIG. 1 may be performed using computer system 200 by processor 201 of FIG. 2 and/or may be at least in part implemented on one or more components of system 300 shown in FIG. 3. For example, the process may be performed by utilizing fit analysis engine 307, design tool 309, recommendations engine 311, and data platform 313 with respect to feedback profile data store 301, sizing profile data store 303, and inventory interface 305. Using the process of FIG. 1, a product can be suggested to a customer based at least on the customer's sizing properties, style preferences, product inventory, and stylist selection.

At 101, a request to enroll is received. The request to enroll may be received from a potential customer requesting recommendations and/or products. The customer may be enrolled with a product selection and distribution system such as the system of FIG. 3. Upon enrollment, the potential customer becomes a customer and information about the customer may be stored. Products may be provided to the customer once or on a recurring/subscription basis. Products may be selected for a customer based on the customer's preferences, including style and sizing profile, which may be learned over time. In some embodiments, the products selected for the customer may be products which are products designed with the assistance of artificial intelligence/ machine learning to modify an existing base option/product to optimize an optimization goal. As part of enrollment, the customer may provide information about his or her preferences. For example, the customer may provide information directly or indirectly. The information may be provided through a personalized app or third party styling or messaging platforms. This information may be stored in a database such as feedback profile data store 301 or sizing profile data store 303 of FIG. 3.

At 103, customer attributes are determined based on the request to enroll. Customer attributes may include objective attributes such as biographical information and sizing measurements. Customer attributes may include subjective attributes such as preferences for style, fit, colors, designers/ brands, budget, etc. For example, a customer may rate specific styles, prints, and/or attributes including those products in an inventory and products from other providers. A customer's attributes may include sizing attributes such as the customer's sizes, measurements, fit challenges, and/or fit preferences. The information may be collected through third party apps or platforms such as apps that allow a user to indicate interests and/or share interest in products with other users. Customer attributes may be collected when a customer enrolls with the system. For example, the customer may complete a survey about his or her measurements (height, weight, etc.), lifestyle, and preferences. This information may be stored to a customer profile. Customer sizing feedback may be stored in a feedback data store such as feedback profile data store 301 of FIG. 3. Customer attributes may be determined from social media and content created or curated by the customer on third party platforms such as Pinterest®, Instagram®, Facebook®, LinkedIn®, and the like.

When the customer makes purchases and provides feedback on products, customer attributes may be updated. For example, the customer profile and feedback may be updated. The customer may provide feedback in various formats including completing surveys, writing product reviews, making social media posts, and the like regarding one or more products. Products recommended to the customer may be adapted to a customer's changing attributes and taste. In one aspect, the customer's taste may be learned over time by a computer system and/or stylist. Customers may also provide sizing feedback. For example, an item may fit too large, too small, or perfectly. As another example, an item may have sleeves that are too long. In one aspect, the customer's sizing may be learned over time by a computer system and/or stylist.

In various embodiments, customer attributes may be determined based on generalizations about other users who share characteristics with a particular customer. Generalizations about groups of customers may be made from individual customer attributes. Customers may be grouped by any characteristic, including gender, body type, shared preference (e.g., a measure of similarity between clients such as clients' objective, subjective, and/or sizing attributes or learned similarity in product preferences), and the like.

At 105, product options are determined based on the customer and global attributes. The product options may be determined by processing the customer attributes to select a subset of products from all products in an inventory. The product options may be provided to stylists. In various embodiments, instead of directly offering all of the product options to the customer, a stylist first selects products from among the product options to provide to the customer. In various embodiments, the product options are also determined based on global attributes/constraints. For example, a particular product in inventory can only be allocated to one customer. Using global attributes/constraints, the product options for a particular customer take into account whether this customer should be matched with the product instead of other customers. In some embodiments, each customer should be allocated at least a minimum number of products. For example, each customer should have at least five product recommendations. In some embodiments, the global constraints may require a minimum number of product types to be included in product recommendations for each customer. For example, each customer should receive recommendations that include a variety of product types such as a mix of shirts, pants, sweaters, jewelry, etc. In some embodiments, the inventory used is based on the current and/or future inventory. In some embodiments, the inventory is a threshold time period that covers a weekend and/or a period of time where the inventory is not restocked. For example, the inventory threshold time period may be configured to cover until the next expected restocking or processing of returns for the inventory.

In various embodiments, the various customer and global attributes utilize one or more models to determine product options and the likelihood a customer will retain or purchase the item. For example, one or more models, such as sales model(s), inventory model(s), variety model(s), rating model(s), predicted size fit model(s), etc. are used. As an example, each trained model may receive as input a feature or combination of features and predict/score a performance metric such as a sales metric, inventory metric, variety metric, style rating, size rating, fit rating, quality rating, retention, personalization, style grouping, and/or price value rating.

In various embodiments, a plurality of models are trained and each model corresponds to a respective performance metric. For example, a sales model is trained to determine a sales metric, an inventory model is trained to determine an inventory metric, and rating models may be used to determine style rating, size rating, fit rating, quality rating, retention score, personalization score, style grouping rating, and price value rating, among others. The models may be trained with training data sets, where the training data sets correspond to particular categories and segments. In various embodiments, a match score model is trained to determine a match score metric, such as the match score used to determine product options.

At 107, a product selection is received from a stylist based on the product options. A stylist (e.g., a human reviewer) selects a product selection from the product options. The product selection may then be offered to a customer. Suppose a customer is looking for blouses. One or more blouses may be automatically selected from the inventory based on the customer's attributes. Instead of providing the blouses directly to a customer, a stylist selects a sub-set of blouses to offer to the customer. Statistics about the product selection such as whether an item was selected to be part of the product selection, when the item was selected to be part of the product selection, for who/what type of customer was the item selected, etc. can be stored. In various embodiments, the stylist may rely on the predicted size fit to select items that are predicted to fit the customer well. Similarly, the stylist may rely on the predicted size fit to exclude items from being selected that are predicted to fit poorly.

In various embodiments, a human stylist is informed of the product options with the addition of purchase metrics such as a likelihood to purchase or desirability prediction metric. For example, the likelihood to purchase metric incorporates a predicted size metric and may incorporate other metrics such as a sales metric, an inventory metric, and metrics based on style, quality, retention, personalization, style grouping, price value, etc. A human stylist may use the overall likelihood to purchase or desirability prediction metric to inform the stylist's selection of products for a customer. By ranking potential options using the determined metrics and providing inferred purchase information for each of the product options, a stylist is able to make a more informed selection for her or his customer. The stylist can incorporate her or his human expertise on style, sizing, fit, etc. with quantified purchasing metrics determined using artificial intelligence and machine learning. The final product selection is influenced both by the uniquely human qualities of the stylist, such as the stylist's expertise and the stylist's relationship and understanding of the customer, as well as data science based on past purchase decisions and feedback of collective customers.

At 109, a product selection is provided to a customer. A shipment of items may be provided to a customer. The customer may then decide to keep or return one or more of the items in the shipment. In some embodiments, in the event the customer decides to retain an item, then the customer purchases the item. Statistics about the items such as whether they were kept or returned, when they were kept or returned, and/or who/what type of customer kept or returned the item, among others can be stored.

At 111, feedback about the product selection is received. A customer may provide feedback about the product selection such as reasons why the customer is keeping or not keeping one or more items in the product selection. In various embodiments, a customer provides sizing feedback and style feedback on the product selection provided in 109. For example, the customer may provide feedback indicating a blouse is too loose or too tight in the chest. As another example, a customer may provide feedback that a pair of jeans fits perfectly. Feedback may be provided using a coarse granularity such as too large, too small, or fits perfectly. Feedback may also be provided using a finer granularity such as the thigh opening is too tight or the sleeves are too short by two inches. The feedback may be provided by the customer in various formats including completing surveys, writing product reviews, making social media posts, and the like. In various embodiments, the feedback may be used to design or purchase products that might appeal to a particular customer base or meet optimization goals.

At 113, information about the product selection and/or feedback is stored. For example, sizing information may be stored in a database such as feedback profile data store 301 or sizing profile data store 303 of FIG. 3. In some embodiments, the information stored includes style feedback, fit challenges, and/or fit preferences of the customer. The information about a customer's style preference, sizing, and/or a product item's sizing may be extracted to learn and predict over time by a computer system and/or stylist the product items for a customer and/or group of customers. In some embodiments, the stored information is used to train one or more machine learning models as described with respect to FIG. 4. In various embodiments, product item feedback is stored using an associated identifier or a stock keeping unit (SKU) and customer feedback is stored using an associated customer identifier.

Figure 2:
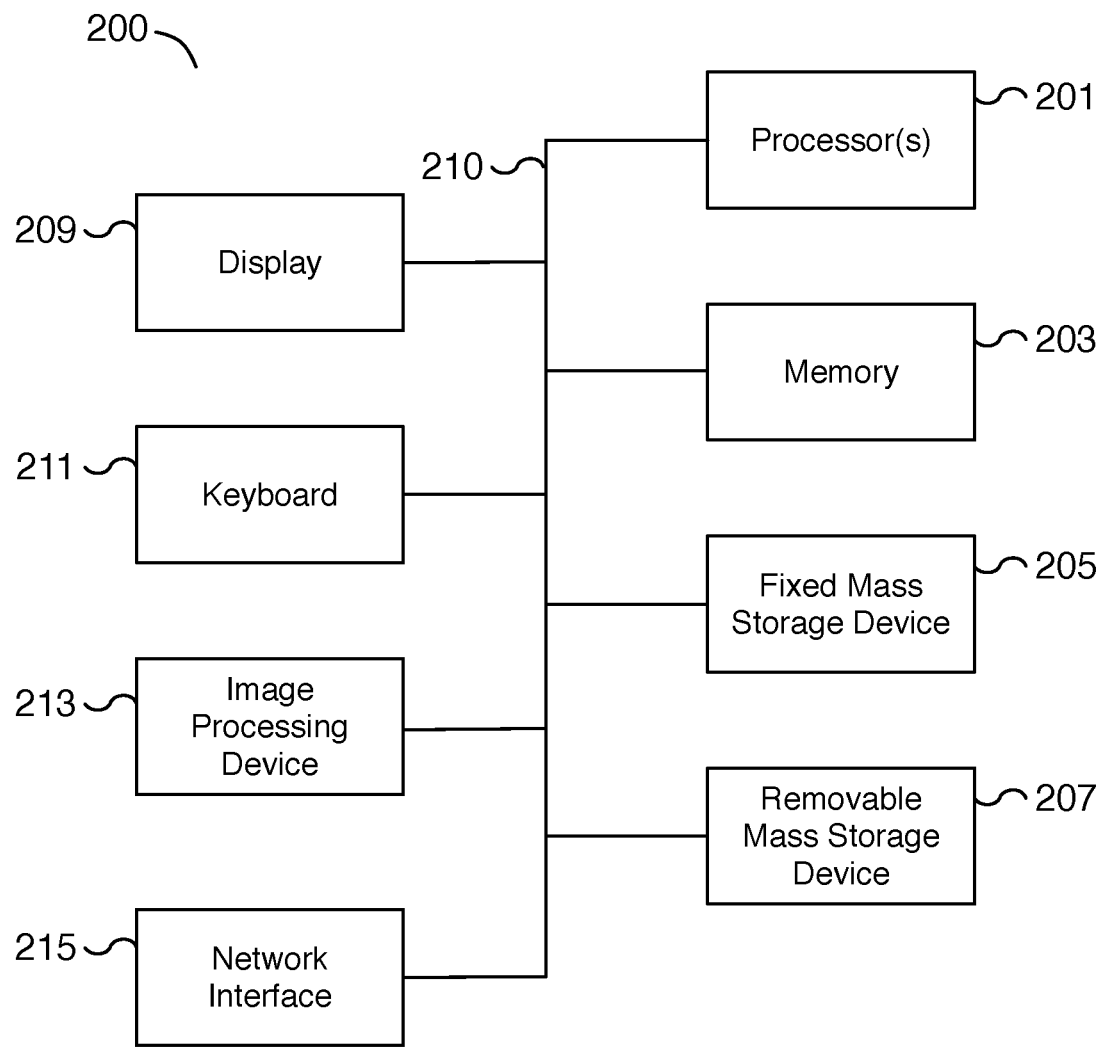
FIG. 2 is a functional diagram illustrating a programmed computer system for determining a product suggestion in accordance with some embodiments.

FIG. 2 is a functional diagram illustrating a programmed computer system for determining a product suggestion in accordance with some embodiments. As will be apparent, other computer system architectures and configurations can be used to perform the described product generation technique. Computer system 200, which includes various subsystems as described below, includes at least one microprocessor subsystem (also referred to as a processor or a central processing unit (CPU) 201). In some embodiments, computer system 200 is a virtualized computer system providing the functionality of a physical computer system. For example, processor 201 can be implemented by a single-chip processor or by multiple processors. In some embodiments, processor 201 is a general purpose digital processor that controls the operation of the computer system 200. In some embodiments, processor 201 also includes one or more coprocessors or special purpose processors (e.g., a graphics processor, a network processor, etc.). Using instructions retrieved from memory 203, processor 201 controls the reception and manipulation of input data received on an input device (e.g., keyboard 211, image processing device 213, etc.), and the output and display of data on output devices (e.g., display 209).

In some embodiments, processor 201 is used to optimize product suggestions for a group of customers. The optimized selection results may be used as product options for one or more stylists for determining product selections for a group of customers. In various embodiments, the optimized selection results may be used to inform product design, manufacturing, and/or purchasing decisions. In some embodiments, processor 201 is used to train a machine learning model for determining match score metrics between a customer and a product. Once trained, processor 201 may be utilized to determine a match score value for each customer and each inventory product using the trained machine learning model. In various embodiments, processor 201 may utilize the determined match score values for global optimization of product allocation. In various embodiments, the match score metrics correspond to desirability prediction values.

In some embodiments, processor 201 includes and/or is used to provide elements 101, 103, 105, 107, 109, 111, and/or 113 with respect to FIG. 1. In some embodiments, processor 201 is used to communicate with or provide the functionality of data stores 301 and 303 and inventory interface 305 of FIG. 3. In some embodiments, processor 201 is utilized by the elements 307, 309, 311, and 313 of FIG. 3. In some embodiments, processor 201 performs the processes described below with respect to FIGS. 4-9.

Processor 201 is coupled bi-directionally with memory 203, which can include, for example, one or more random access memories (RAM) and/or one or more read-only memories (ROM). As is well known in the art, memory 203 can be used as a general storage area, a temporary (e.g., scratch pad) memory, and/or a cache memory. Memory 203 can also be used to store input data and processed data, as well as to store programming instructions and data, in the form of data objects and text objects, in addition to other data and instructions for processes operating on processor 201. Also as is well known in the art, memory 203 typically includes basic operating instructions, program code, data, and objects used by the processor 201 to perform its functions (e.g., programmed instructions). For example, memory 203 can include any suitable computer readable storage media described below, depending on whether, for example, data access needs to be bi-directional or uni-directional. For example, processor 201 can also directly and very rapidly retrieve and store frequently needed data in a cache memory included in memory 203.

A removable mass storage device 207 provides additional data storage capacity for the computer system 200, and is optionally coupled either bi-directionally (read/write) or uni-directionally (read only) to processor 201. A fixed mass storage 205 can also, for example, provide additional data storage capacity. For example, storage devices 205 and/or 207 can include computer readable media such as magnetic tape, flash memory, PC-CARDS, portable mass storage devices such as hard drives (e.g., magnetic, optical, or solid state drives), holographic storage devices, and other storage devices. Mass storages 205 and/or 207 generally store additional programming instructions, data, and the like that typically are not in active use by the processor 201. It will be appreciated that the information retained within mass storages 205 and 207 can be incorporated, if needed, in standard fashion as part of memory 203 (e.g., RAM) as virtual memory.

In addition to providing processor 201 access to storage subsystems, bus 210 can be used to provide access to other subsystems and devices as well. As shown, these can include a display 209, a network interface 215, an input/output (I/O) device interface 211, an image processing device 213, as well as other subsystems and devices. For example, image processing device 213 can include a camera, a scanner, etc.; I/O device interface 211 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 200. Multiple I/O device interfaces can be used in conjunction with computer system 200. The I/O device interface can include general and customized interfaces that allow the processor 201 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 215 allows processor 201 to be coupled to another computer, computer network, or telecommunications network using a network connection as shown. For example, through the network interface 215, the processor 201 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 201 can be used to connect the computer system 200 to an external network and transfer data according to standard protocols. For example, various process embodiments disclosed herein can be executed on processor 201, or can be performed across a network such as the Internet, intranet networks, or local area networks, in conjunction with a remote processor that shares a portion of the processing. Additional mass storage devices (not shown) can also be connected to processor 201 through network interface 215.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 211 and display 209 share the touch sensitive screen component, which both detects user inputs and displays outputs to the user). In addition, bus 210 is illustrative of any interconnection scheme serving to link the subsystems. Other computer architectures having different configurations of subsystems can also be utilized.

Figure 3:
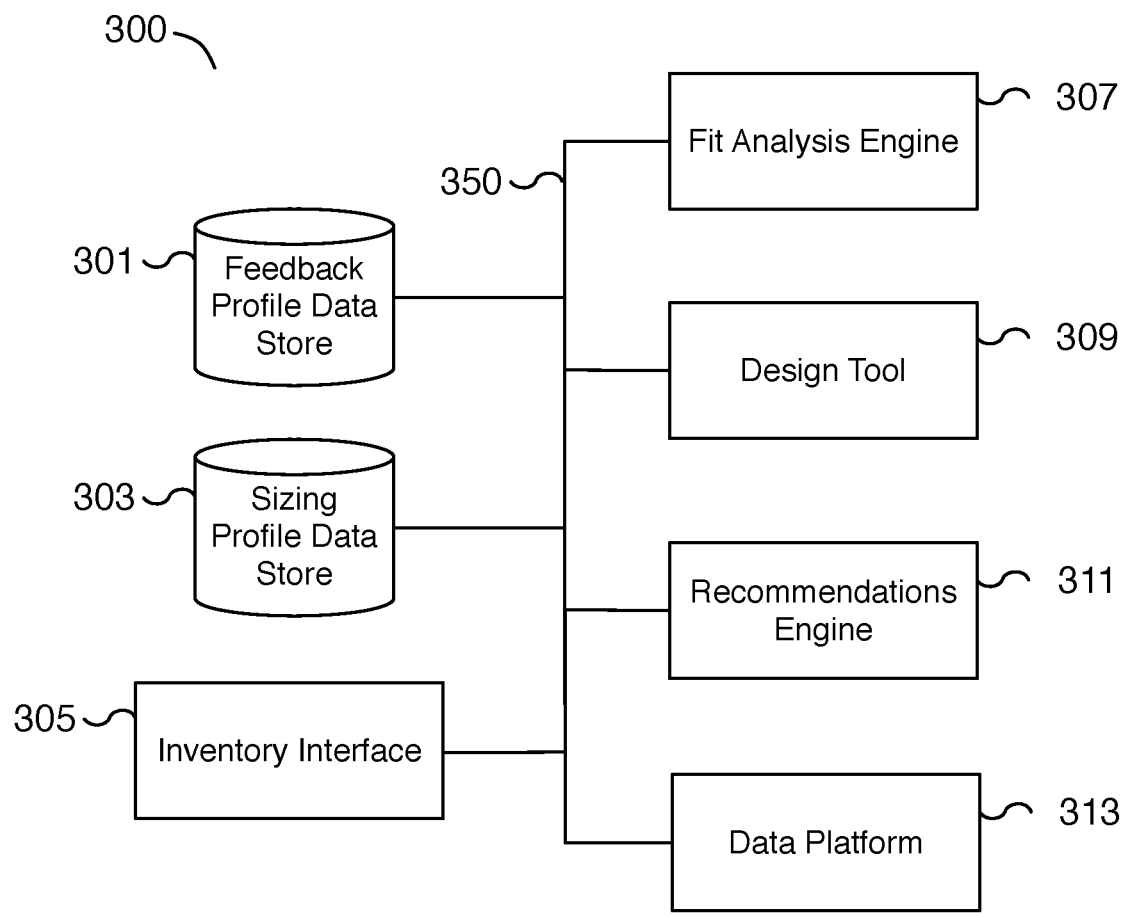
FIG. 3 is a block diagram illustrating an embodiment of a system for performing global optimization of inventory allocation.

FIG. 3 is a block diagram illustrating an embodiment of a system for performing global optimization of inventory allocation. The example system 300 shown in FIG. 3 includes feedback profile data store 301, sizing profile data store 303, inventory interface 305, fit analysis engine 307, design tool 309, recommendations engine 311, and data platform 313. Each of these components may be communicatively coupled via network 350. In some embodiments, the allocation of products as suggested product purchases to customers utilizes system 300. In some embodiments, system 300 is used to perform the processes described with respect to FIGS. 1 and 4-9.

In the example shown, feedback profile data store 301 and sizing profile data store 303 may be configured to store information about customers, products, sales data, performance metrics, and machine learning models. In some embodiments, feedback profile data store 301 may be utilized for storing feedback from users or customers related to products and sizing profile data store 303 may be utilized for storing sizing profile data regarding different garment products. In some embodiments, feedback profile data store 301 and sizing profile data store 303 may exist as a single unified data store or spread across multiple data stores.

In some embodiments, the feedback profile data store 301 stores information including customer or user feedback on size, fit rating, quality, print/style, and price for any test fitted garment. In some embodiments, the feedback includes feedback from a stylist, designer, and/or supplier. In some embodiments, the feedback includes user size measurements, fit challenges, and fit preferences. In various embodiments, the feedback includes a corresponding reference to a garment with sizing profile information in the sizing profile data store. In some embodiments, a garment is referenced using a garment identifier or a stock keeping unit (SKU). Information in the feedback data store about an item may be stored with statistics such as a sales metric (e.g., statistics related to sales of an item or group of items), an inventory metric (e.g., statistics related to inventory such as number of units in inventory), variety (e.g., a measure of diversity of inventory and related information such as addressable market), etc.

In some embodiments, sizing profile data store 303 stores sizing profile information including data associated with a product or group of products. In some embodiments, sizing profile information is categorized by product silhouette category. A product silhouette category may be used to define a unique category of garments, such as sport coats, long sleeve tops, short sleeve tops, three-quarter sleeve tops, pull over tops, sleeveless tops, shorts, and jeans, among others. In some embodiments, the garment shape as well as material or construction additionally define a garment silhouette. Examples of material and/or construction include woven, knit, and denim, among others. For each garment, sizing profile information includes measurements for the garment for each garment size. In some embodiments, measurements are taken based on the garment silhouette category and different silhouette categories include different measurements. For example, measurements for a pant silhouette may include a waist, inseam, thigh, front leg opening, and back leg opening measurement, among others. In contrast, measurements for a short sleeve knit top may include a neck opening, shoulder-to-shoulder, chest, sleeve length from armhole, and bicep measurement, among others. Sizing profile information may also include product information such as objective attributes of the product such as a stock keeping unit (SKU), item type, item property (e.g., color, pattern, material), etc. Product information may include subjective attributes of the product such as suitability for body types, season, etc. Product attributes may be identified by a human or by a machine. Product information may include a representation of the product such as text, image, video, or other form of data.

The inventory interface 305 may be configured to store and retrieve inventory information from one or more inventory data stores. In some embodiments, the inventory interface is an interface to one or more local or remote inventory data stores. For example, using the inventory interface, inventory information may be retrieved and/or updated via a vendor hosting one or more inventory data stores remotely. In some embodiments, an inventory data store includes one or more first-party inventory systems hosted either locally or remotely. In some embodiments, inventory data stores may be structured based on warehouses such that each warehouse has a corresponding inventory data store. In some embodiments, different inventory data stores utilize different interfaces, such as different application programming interfaces or query languages. The inventory interface translates inventory requests and updates to and from the components of FIG. 3 using the appropriate inventory data store interface. In various embodiments, inventory information may include garment or product inventory information including a stock keeping unit (SKU), an item type, an item property (e.g., color, pattern, material), a silhouette category, quantity for each product, as well as historical information along with other similar appropriate inventory information.

In various embodiments, the inventory interface is used to access information about how many units of each item are in the inventory. Supply chain information such as how many units of an item have been ordered, when they are expected to be received to replenish a stock of the item, etc. may be accessed via the inventory interface.

The fit analysis engine 307 determines fit analysis for garments by utilizing data from feedback profile data store 301 and sizing profile data store 303. For example, fit analysis engine 307 may be utilized to determine the values for variable size components for a particular garment. In some embodiments, fit analysis engine 307 utilizes data platform 313 to retrieve and/or update data related to feedback, sizing, and/or inventory. Fit analysis engine 307 utilizes data platform 313 to retrieve feedback on sizing from customers and the sizing profile of the garment and/or related garments to determine the applicable variable size components. In some embodiments, fit analysis engine 307 may further utilize data platform 313 to determine the inventory status of one or more garments. For example, when performing fit analysis, fit analysis engine 307 may utilize inventory information, including historical inventory information, to determine the appropriate variable size components.

The design tool 309 may be configured to employ adaptive machine learning to help a designer design garments for the customers according to the customers' tastes. The designed items may be a hybrid of a base garment sized up or down based on variable size components. The design tool 309 may be configured to execute the processes described herein to design a product, where the product incorporates a predicted size fit satisfaction, as further described herein. For example, a designer may use the design tool 309 to create a new garment from a base garment. The selection of one or more values for variable size components may be based on an optimization goal such as increasing the size fit satisfaction. Thus, the garment may be a result of a combination of machine learning/artificial intelligence selected variable size components, where the variable size components are automatically determined to be among the best measurements to meet an optimization goal. For example, values for the variable size components may be ranked according to how well each meets the size fit satisfaction goal.

For example, to at least in part automatically design a product, a system aggregates data collected from a customer, stylist, and/or designer and measurement data from garments. Data platform 313 may build one or more trained models using machine learning processes further described herein. The training data to train the models may be based on behavior and/or feedback of the customer, stylist, and/or the designer as stored over time in the feedback data store, sizing profile information related to garments as stored in the sizing profile data store, and/or an inventory database accessible via the inventory interface. When a designer selects a base garment, one or more sizing goals are selected via the design tool. The fit analysis engine is used to determine values for the variable size components of the base garment to accomplish the sizing goals. The determined variable size components are presented via the design tool to the designer.

In some embodiments, the designer may choose to size up or down the garment. As another example, the designer may choose to size the base garment to another canonical size from a base canonical size. A canonical base size of medium may be used to scale a garment to an extra-small, small, large, extra-large, etc. As another example, the designer may choose to scale a canonical base size to a size variation of the base size within the same canonical size, such as from a medium to a medium-short and/or a medium-tall. As another example, the designer may choose to scale a base garment to a selection of users, such as a cluster of users. The designer specifies the user or group of users as the target audience instead of specifying a size.

In various embodiments, an alternative size for a variable size component may be determined based at least in part on collaborative filtering and/or client segmentation. For example, an alternative size for a component may be selected based on a likelihood that a size would fall into a cluster (e.g., an addressable market). To determine whether a garment with determined size components would fall into a cluster, a set of features making up the garment may be analyzed to determine whether the set would cause the garment to meet a size fit satisfaction goal (e.g., whether it would be an optimal result to fit analysis). The cluster may be based on feedback such as sizing feedback from the user and sizing measurements obtained from the user's garments.

The recommendations engine 311 may be configured to employ adaptive machine learning to provide recommendations to stylists who select items for customers from an item inventory. For example, the system may use a machine learning trained model to score products. The top scoring products may be provided to the stylist. The stylist (e.g., a human) then selects one or more of the top scoring products to be offered to a customer. The customer may purchase/keep the product and/or provide feedback about the product. The feedback may be used to improve the machine learning training models and may be stored in feedback profile data store 301. In various embodiments, recommendations engine 311 provides recommendations based on global optimization results. For example, recommendations engine 311 determines recommendations by taking into account the best allocation of inventory as product suggestions based on the preferences of an entire group of customers rather than only considering the preferences of a single customer of the group. This global optimization of product suggestions results in a better overall customer satisfaction across the entire group of customers. In various embodiments, recommendations engine 311 takes into account global constraints when determining product recommendations.

The data platform 313 may be configured to coordinate operation of feedback profile data store 301, sizing profile data store 303, inventory interface 305, fit analysis engine 307, design tool 309, and recommendations engine 311. For example, when data is generated by interaction of a customer, stylist, designer, and/or supplier with system 300, the data platform 313 may determine what information is to be stored and where. For example, data platform 313 may store the feedback data in feedback profile data store 301 and sizing profile data in sizing profile data store 303. The data platform 313 may also store the data as part of a training data set for machine learning as further described herein. As another example, when measurement data is received for different garments, data platform 313 may store the measurement data as a sizing profile in sizing profile data store 303. As a further example, data platform 313 may determine to store inventory related data using inventory interface 305. For example, in the event the inventory count for a particular garment needs to be retrieved, data platform 313 may determine that inventory interface 305 is the appropriate component from which to retrieve the information. Data platform 313 may direct the request for inventory updates to inventory interface 305. In various embodiments, data platform 313 may be communicatively coupled to feedback profile data store 301, sizing profile data store 303, inventory interface 305, fit analysis engine 307, design tool 309, and recommendations engine 311.

In various embodiments, fit analysis engine 307 and recommendations engine 311 may be configured to perform the processes described herein, e.g., the processes shown in FIGS. 1 and 4-9, to determine product options based on global optimization results. In addition, design tool 309 may receive input, automatically make design recommendations using machine learning/artificial intelligence, and generate output design specifications based at least in part on global optimization results from recommendations engine 311. The output of the design tool 309 may be provided to a supplier to manufacture a product according to the specifications of the output.

Figure 4:
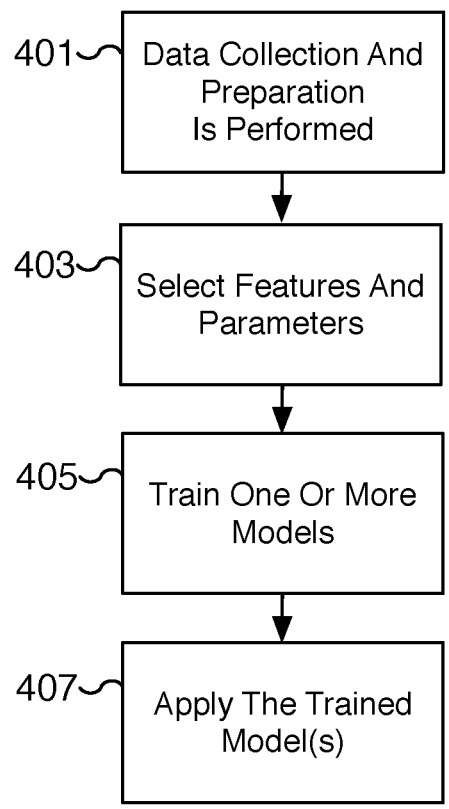
FIG. 4 is a flow chart illustrating an embodiment of a process for machine learning to train one or more prediction models.

Machine learning models may include trained models generated from a machine learning process such as the process of FIG. 4. Trained models may be categorized by type such as feedback models, sizing profile models, inventory models, variety models, etc. For each category of model, a model may be generated for each of one or more segments such as segments based on one or more of the following: a garment silhouette, target body type, a target seasonality, a target fiscal quarter, a target customer type or business line (e.g., women, men, children, petite, plus, maternity), a target lifestyle, a target product type (e.g., blouse, dress, pants), a target style (e.g., edgy, urban, Pacific Northwest), etc. A model may correspond to a particular segment such as a client segment, time period, etc. For example, a first model may be for the sales performance of a product for a group of customers with a first body type such as petite and a second model may be for the performance of a product for a group of customers with a second body type such as tall.

In some embodiments, a machine learning trained model can be utilized to predict a value for a variable size component of a garment. The model may be trained using past customer feedback data on garment fit and sizing profile information of the garment. The fit results along with the actual garment measurements are incorporated into the training corpus to predict a size fit satisfaction. The training corpus may be trained based on a selected garment silhouette category.

In some embodiments, once a garment is created, a machine learning trained sales model can be further utilized to predict a sales of a product with features indicated to the model. The sales model may be trained using past sales data. In some embodiments, a machine learning trained inventory model can be utilized to predict an inventory metric associated with a created garment with features indicated to the model. The inventory model may be trained using sales data, current inventory information, past inventory information, etc. In some embodiments, a machine learning trained variety model can be utilized to predict a likelihood of whether a garment with features indicated to the model would be desirable to add to an inventory of product offerings to achieve an ideal distribution of inventory variety.

In one aspect, the variety model may be used to identify the value of variety in the inventory even where exactly whom the style is for is typically not identifiable. The variety model may measure a product in terms of the product globally filling a need. The variety model may help expand the total addressable market. That is, even if a product does not perform well with a current customer, the product may perform well with potential/future customers. In another aspect, a customer may prefer having more color choices even if he or she tends to purchase only one color. The customer might like the increased possibility that he or she is purchasing a unique blouse in his or her color because the blouse is offered in many color choices. The variety model may be trained using higher level indications of desired distribution of inventory variety. For example, machine learning training may have to be utilized to determine a higher level model for ideal inventory distribution based on higher level product categories, and the variety model is trained using this higher level model to determine a model for ideal inventory distribution based on product features. For example, a particular blouse style may be offered in three colors. Although one of the colors may not sell as well as the other two colors, providing the third color as an option may represent value in the inventory.

In various embodiments, other models may be utilized. Example models include models for style rating, size rating, fit rating, quality rating, retention, personalization, style grouping, and price value rating as further described herein with respect to FIGS. 1 and 4-9. These models may be utilized in combination with feedback and sizing models to generate or recommend a garment that not only optimizes a size fit satisfaction but also other optimization goals including quality, retention, personalization, style, and price value goals. An overall match score value may be determined and used for global optimization to make a different set of merchandise available to a stylist for each customer. The suggested products are optimized for a group of customers and account for the needs of the collective group of customers, present inventory state, and future inventory state. By optimizing globally, the overall customer satisfaction is increased compared to optimizing locally by considering only each particular customer's preferences at a particular moment in time with the current inventory.

In some embodiments, feedback profile data store 301, sizing profile data store 303, inventory interface 305, fit analysis engine 307, design tool 309, recommendations engine 311, and data platform 313 may be configured to perform the processes described herein, e.g., the processes shown in FIGS. 1 and 4-9. In some embodiments, the components of FIG. 3 may be communicatively coupled to one another to perform the processes shown in FIGS. 1 and 4-9 on input received at fit analysis engine 307, design tool 309, and/or recommendations engine 311.

FIG. 4 is a flow chart illustrating an embodiment of a process for machine learning to train one or more prediction models. The process of FIG. 4 may be at least in part implemented on one or more components of system 300 shown in FIG. 3. In some embodiments, the process of FIG. 4 is performed by processor 201 of FIG. 2. In some embodiments, the models trained using the process of FIG. 4 are utilized by the processes for FIGS. 1 and 5-9.

At 401, training data is collected and prepared. In some embodiments, training data is sizing feedback data, style data, garment preference data, or other appropriate data. In some embodiments, sizing feedback data is retrieved from a feedback data store such as feedback profile data store 301 of FIG. 3. The sizing feedback data includes sizing information from users who have tested a particular garment. The sizing feedback data may include user size attributes, user sizing ratings, and user fit ratings. In some embodiments, user size attributes include size measurements, fit challenges, and fit preferences of the user. For example, size measurements may include the body shape, height, and weight of the user as well as more detailed measurements such as the user's shoulder width, inseam, waist, chest, cup size, shirt size, pant size, etc. In some embodiments, fit challenges are utilized and may include body specific challenges for achieving a good fit rating. Examples of fit challenges include sleeve length is too long or short, thigh diameter is too small, and chest is too loose or tight. In some embodiments, fit preferences are utilized and may include body specific preferences such as slim v. regular v. relaxed or fitted v. loose shirts. In some embodiments, the sizing rating reflects a customer's feedback on the accuracy of the size label for a given garment. In some embodiments, the fit rating reflects how well the given garment fits the customer. In various embodiments, the feedback data includes a garment identifier, such as a stock keeping unit (SKU), for preparing the data and merging the feedback data with sizing profile data.

In some embodiments, data collected includes sizing profile data. Sizing profile data may be retrieved from a sizing profile data store such as sizing profile data store 303 of FIG. 3. The sizing profile data includes sizing measurement information for garments. In some embodiments, the sizing profile data is retrieved only for garments that have user feedback. In some embodiments, sizing profile data is retrieved only for garments of the same silhouette category. In various embodiments, the sizing profile data includes various measurements or points of measurements of the garment. In some embodiments, the measurements are associated with a garment silhouette category. In various embodiments, the sizing profile data includes a garment identifier, such as a stock keeping unit (SKU), for preparing the data and merging the sizing profile data with user feedback data.

In some embodiments, data collected includes additional data such as style preferences, style properties of products, and/or past purchase information, among other relevant purchase data. By utilizing features such as style preferences, style properties, and past purchase information, a machine learning model can be trained to predict the likelihood a customer with a particular style preference will purchase a product with particular style properties. For example, certain customers may prefer dress shirts with a particular collar type while other customers may prefer dress shirts with a particular cuff type and a different collar type.

In various embodiments, the data collected is prepared. For example, the user feedback and sizing profile data for a particular garment is collected, merged, and prepared into a training data for a training corpus. In some embodiments, the data is prepared into a training data set and a validation set. Thus a portion of the data is utilized for training and a separate portion is utilized for validating the training results.

In some embodiments, different prediction models can be trained for different prediction model categories or segments. To train each of the different models, different sets of training data can be gathered specifically for different models to be trained. For example, past data associated with a variable size component to be predicted for a particular garment silhouette category is gathered for various different segments, and different models of the particular silhouette category may be trained for each of the various different segment combinations.

At 403, supervised machine learning features and parameters are selected. For example, a user may set control parameters for various machine learning algorithms to be used to train a model. The selection of the features refers to the selection of machine learning features or individual identifiable properties associated with an item, preference, sizing property, etc. The features and parameters may be selected based on objectives for the trained model. Examples of features for a garment product include type (e.g., blouse, dress, pants), silhouette (e.g., a shape of the garment), print (e.g., a pattern on a fabric), material, hemline, sleeve, etc. The selection of features to be utilized in prediction models can be defined at least in part by a human user or at least in part by automatically being determined. For example, a human or artificial intelligence may define features of the prediction models to be trained.

In various embodiments, the features may be based at least in part on natural language processing (NLP). For example, a computer system may extract information from text according to NLP techniques. Text generated by and about customers such as in product reviews, comment forms, social media, emails, and the like may be analyzed by an NLP system to determine customer size and fit ratings. For example, a customer may provide feedback (e.g., text) when they receive an item. The feedback provided by the customer may be processed with NLP techniques to extract features. NLP techniques include rule-based engines, clustering, and classification to make determinations about characteristics of a product that might be considered a feature. Features may be identified by machine learning or computer vision or NLP, and recommended for inclusion in a product design. In various embodiments, term frequency-inverse document frequency (TFIDF), latent Dirichlet allocation (LDA), colocation analyses, and the like can be used to create lower-dimensional representations of styles or to generate words or phrases representing styles. Various machine learning methods can then predict metrics/optimization goals using these features. Features that predict the optimization goal can then be related back to representative styles to communicate the concept to designers and/or manufacturers.

At 405, one or more machine learning models are trained using the training data prepared at 401. In supervised machine learning, training data may be utilized to train a prediction model to perform predictions based on information "learned" from the training data. In some embodiments, more than one machine learning model is trained. For example, models may be trained by categorized type such as by garment silhouette category (e.g., knit blouse, woven dress, denim pants, etc.), target body type, target seasonality, target fiscal quarter, target customer type or business line (e.g., women, men, children), target lifestyle, target style (e.g., edgy, urban, Pacific Northwest), etc. Different client and garment segments may be used to categorize the model types depending on the optimization goal.

In some embodiments, a prediction model of a particular model type can be utilized to predict a size fit satisfaction for a variable size component with features indicated to the model. As an example, size and fit training data from user feedback of different denim skirts and corresponding sizing profiles for the denim skirts are utilized to train a denim skirt silhouette category model. The trained denim skirt silhouette category model may be used to infer the size fit satisfaction of a new garment with particular values for the variable size components. Moreover, the trained denim skirt silhouette category model may be utilized to optimize the size fit satisfaction to generate values for the variable size components that optimize fit rating for a particular user or group of users. The values of the variable size components may be utilized to manufacture a new garment with the determined measurement values and/or to make purchase decisions from different vendors offering different garment variation sizes.

In some embodiments, one or more trained models may be used to determine a match score corresponding to the likelihood a particular customer will purchase a particular product. In some scenarios, a single model is used to determine the match score. In other scenarios, multiple models are used to determine the match score. In various embodiments, the match score utilizes features such as customer sizing preferences, style preferences, fit issues, garment sizing, etc. In some embodiments, a product desirability prediction value corresponds to a match score for a customer and particular article type.

In various embodiments, the model may be trained according to supervised learning or other machine learning techniques. In supervised learning, the objective is to determine a weight of a feature in a function that optimizes a desired result, where the function is a representation of the relationship between the features. In a training process, weights associated with features of a model are determined via the training. That is, the contribution of each feature to a predicted outcome of the combination of features is determined. In various embodiments, the model may be trained using mixed effects models that take into account several features, some of which may be non-independent. The model may be trained by ridge regression that attributes credit to a particular feature.

In some embodiments, when training a model, the attribution of each feature to the output of the function is determined. In some embodiments, a feature represents a combination of features. For example, an individual feature may have a different weighting when that feature is combined with another feature. A feature or set of features may define a base option. As more input is provided to a model, the output of the function becomes closer to a target or validation result.

In various embodiments, a model may be evaluated after the model has been trained. The error of a model is the difference between actual performance and modeled performance. In another aspect, in some situations, a well-trained model may nevertheless diverge from an actual result. In this situation, a product may have an aspect that makes the product perform better than expected. For example, the garment may perform better, such as fit better, than predicted by a trained model. The description of the factor for success is an aspect. This aspect can be leveraged by incorporating the aspect into new garments.

At 407, the trained machine learning model(s) are applied. In some embodiments, for each model type, multiple versions of the model exist. As additional data is collected and prepared, new versions of the model are trained and prepared for production use. For example, as customers test fit new garments, additional sizing information is collected for the garment and added to a training set for a garment silhouette category. Training with the additional data allows for a more accurate training model. In some embodiments, once a model has been validated, the model is transferred to a production system and utilized with a machine learning engine for use in predicting a match score. For example, a trained machine learning model is transferred into a machine learning engine, such as fit analysis engine 307 of FIG. 3, and utilized by a design tool, such as design tool 309 of FIG. 3, for generating optimal measurements for a new garment size. As another example, a trained machine learning model is transferred into a machine learning engine, such as recommendations engine 311 of FIG. 3, for determining product options using a globally optimized product suggestion process across a global group of customers. In some embodiments, a trained machine learning model is used to infer product desirability prediction values.

Figure 5:
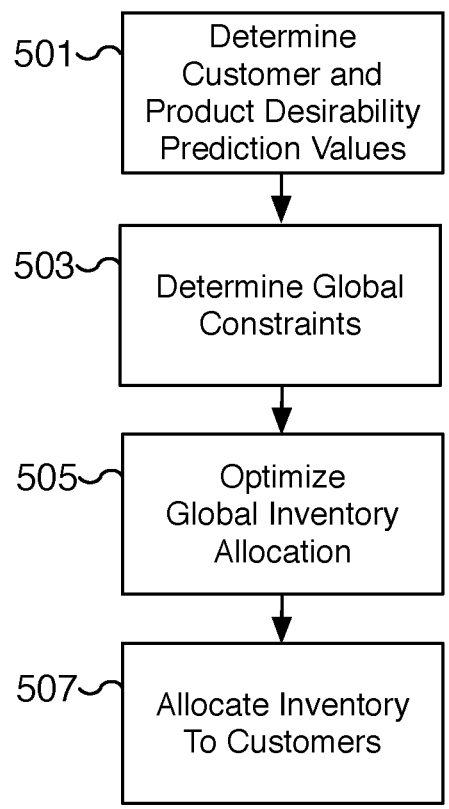
FIG. 5 is a flow chart illustrating an embodiment of a process for performing global optimization of inventory allocation.

FIG. 5 is a flow chart illustrating an embodiment of a process for performing global optimization of inventory allocation. The process of FIG. 5 may be at least in part implemented on one or more components of system 300 shown in FIG. 3. In some embodiments, the process of FIG. 5 is performed by processor 201 of FIG. 2. In some embodiments, one or more models trained using the process of FIG. 4 are utilized by the process of FIG. 5 for the global optimization of inventory allocation. In some embodiments, the process of FIG. 5 is performed at 105 of FIG. 1 to determine product options based on customer and global attributes/constraints for a particular inventory.

At 501, customer and product desirability prediction values are determined. In some embodiments, the desirability prediction values are determined by applying a trained machine learning model. For example, one or more models trained using the process of FIG. 4 are used to determine a desirability prediction value corresponding to a customer and a product. The desirability prediction value may be used to evaluate how likely a customer is to purchase the particular product. In some embodiments, a desirability prediction value is a match score determined for each customer and product combination. In various embodiments, the determined desirability prediction values are normalized. For example, match scores may be scaled so that each client has the same average desirability prediction value. This can be useful to accommodate for client-level marginal variation amongst desirability prediction values.

At 503, global constraints are determined. In various embodiments, global constraints are used to guide the global optimization process. For example, constraints are placed to ensure that the allocation of inventory is indeed optimized globally across a group of customers. Examples of constraints include constraints related to inventory, the number of product types to make available to each customer, allocation constraints, and/or minimum viable assortment constraints, among others. For example, allocation constraints may require that a product is either allocated or not allocated to a customer. As another example, a particular product must be allocated to one and only one customer.

In some embodiments, an inventory constraint includes constraining the allocation of products to a particular inventory metric. Depending on the use case, the inventory allocation may be based on the current inventory, the inventory spanning a certain time window, and/or future inventory. For example, it may be useful to constrain inventory based on the current week's inventory or the inventory over the next four days. As another example, for highly perishable inventory, a shorter time window or the current inventory may be used. In various embodiments, the inventory may be segmented. For example, regular sale inventory may be considered separate from non-sale or clearance inventory. As another example, inventory for children product lines may be separated from maternity inventory. In some embodiments, inventory for different customer groups is separated. For example, inventory for kids (children), women, and men may be separate inventories. Further delineation is also possible. For example, women's clothing can be separated into additional specialized categories such as petite, maternity, and plus categories.

In some embodiments, a constraint is defined to constrain the number of product types made available to each customer. For example, the constraint may require that the same exact number of product types be made available to each customer. This constraint is helpful to ensure that each customer receives product choices and that no customers are left out. The constraint can be informed by customer purchases to determine the number of product choices to make available for each customer.

In some embodiments, a minimum viable assortment constraint ensures that a stylist has a minimum amount of quality inventory to choose from for each customer. Without this constraint, a customer may receive the minimum number of choices with no requirement that the choices match well for the particular customer. A minimum viable assortment constraint ensures that each customer receives quality choices. In various embodiments, the quality metric may be determined at least in part based on the customer's product desirability prediction values.

At 505, global inventory allocation is optimized. Using the constraints determined at 503 and the desirability prediction values determined at 501, inventory is globally allocated to customers. The allocation is determined in a manner that globally maximizes the success across all customers. For example, the global sum of the desirability prediction values of each customer and the customer's allocated inventory is maximized subject to global constraints. In some embodiments, the desirability prediction values are based on the likelihood a customer will keep a particular product and are determined using a match score machine learning model. In various embodiments, the optimization is performed to determine the optimal global sum or to approach a global sum close to the optimal global sum. For example, in some embodiments, approximations are used and/or constraints are relaxed to increase the speed of determining a global optimized inventory allocation.

In various embodiments, global inventory allocation requires determining a group of products (or article types) to allocate for each customer. In some embodiments, each article type corresponds to a style of garment. In some embodiments, each article type corresponds to a style of garment in a particular size. In various embodiments, constraints such as the exact number of product types to make available to each customer or the minimum viable assortment constraint may be dropped, relaxed, or approximated. For example, in a very diverse and well-stocked inventory, one or more constraints may not be applicable. By dropping, relaxing, and/or approximating certain constraints, an optimized allocation of inventory across a group of customers is performed more quickly and with fewer computational resources. In some embodiments, a computing optimization is performed by decoupling customers. By solving inventory allocation for each customer independent of other customers, a global optimization of inventory is computed more efficiently and with fewer computing resources.

In some embodiments, a desirability prediction value $p_{ij}$ corresponds to the probability a client i will keep an article type j. In the scenario, there are N clients and M article types but only $q_j$<N items for each article type j. The article types may be scarce and tradeoffs must be made to determine which customers are allocated which article type. In some embodiments, the desirability prediction values $p_{ij}$ are normalized. Product items corresponding to inventory article types are made available or allocated to customers by an indicator $x_{ij}=1$ to denote that article type j is made available to customer i. The global sum of the desirability prediction values of each customer and the customer's allocated inventory is maximized subject to constraints by determining: $\Sigma_{ij} p_{ij} \cdot x_{ij}$.

In various embodiments, various global constraints determined at 503 are represented using equations for maximizing the global sum of the desirability prediction values. For example, an inventory constraint be represented by the equation: $\Sigma_i x_{ij} < q_j$ where j=1, ..., M. As another example, a constraint that exactly H article types are made available to each customer can be represented by the equation: $\Sigma_j x_{ij}=H$ where i=1, ..., N. As another example, an inventory allocation constraint can be represented by requiring $x_{ij} \in \{0, 1\}$. As previously discussed, a minimum viable assortment constraint may be required. For example, a minimum viable assortment constraint may be represented by the equation: $\Sigma_j \omega_{ij} \cdot x_{ij} \geq Q$ where i=1, ..., N. The $\omega_{ij}$ property is incorporated to refine the quality of the products included in the minimum viable assortment. For example, choosing $\omega_{ij}=1$ would ensure that each customer has at least H choices, but places no constraint that each choice matches well with the customer. In some embodiments, $\omega_{ij}=p_{ij}$ is chosen to require the selected inventory to have a sum that is equal to or exceeds the threshold Q. Using the desirability prediction value $p_{ij}$ associates less desirability for poorer matches (and higher desirability for better matches) and helps to ensure that each customer has a minimum average desirability prediction value for allocated inventory.

In various embodiments, the global inventory allocation is optimized by computing inventory allocation for each customer and product. The optimization problem can be represented using the following optimization problem subject to the described global constraints:

$$\underset{x}{\text{maximize}} \sum_{ij} p_{ij} \cdot x_{ij}$$

subject to constraints:

$$\sum_i x_{ij} < q_j \text{ where } j = 1, \ldots, M$$

-continued $$\sum_j x_{ij} = H \text{ where } i = 1, \ldots, N$$

$$\sum_j \omega_{ij} \cdot x_{ij} \geq Q \text{ where } i = 1, \ldots, N$$

$$x_{ij} \in \{0, 1\}.$$

In various embodiments, one or more constraints may be dropped to simplify the global optimization problem. The resulting related global optimization problem may be more easily solved and require fewer compute resources. For example, the minimum viable assortment constraint may be dropped to allow a variable number of article types to be made available to different customers.

In some embodiments, one or more constraints determined at 503 are approximated. For example, constraints may be approximated using adjustment approximation values that can impact (raise or lower) a desirability prediction value. An inventory product that is scarce and a very good match for some customers will have a high adjustment factor. Only customers that match well with the scarce product will be allocated the product since the high desirability value will offset the relatively high adjustment factor. In some embodiments, adjustment approximation values include an article type adjustment value and a customer adjustment approximation value that combine to determine what customers are allocated which products. In various embodiments, desirability prediction values are adjusted using the adjustment approximation values. In some embodiments, any remaining constraints are used to determine a globally optimized inventory allocation. For example, inventory and number of product types to make available constraints may be approximated and used to determine adjusted desirability prediction values. In some embodiments, the adjusted desirability prediction values are modified match scores. The adjusted desirability prediction values and a minimum viable assortment constraint are then used to determine inventory allocation. In some embodiments, the inventory allocation is determined for each customer to globally allocate inventory.

In some embodiments, adjustment approximation values are determined at a regular interval. This optimization helps to reduce the compute resources needed to determine global inventory allocation. Between compute intervals, the adjustment approximation values may be treated as slowly varying values. In some embodiments, the regular interval for determining and selecting adjustment approximation values is configured on the scale of days and hours. For example, the adjustment approximation values may be selected once every seven days.

At 507, inventory is allocated to customers using the optimized inventory allocation determined at 505. In some embodiments, a stylist receives the determined inventory allocation results and uses a customer's allocation as product options for product suggestions. The stylist selects a product selection based on product options knowing that the provided allocations are available and match well with the customer based on desirability prediction values. In some embodiments, the product selections are then made available to the customer as purchase suggestions. For example, five physical article types such as a dress, a shirt, a pair of pants, a blouse, and a necklace are shipped to a customer on a trial basis for purchase consideration.

Figure 6:
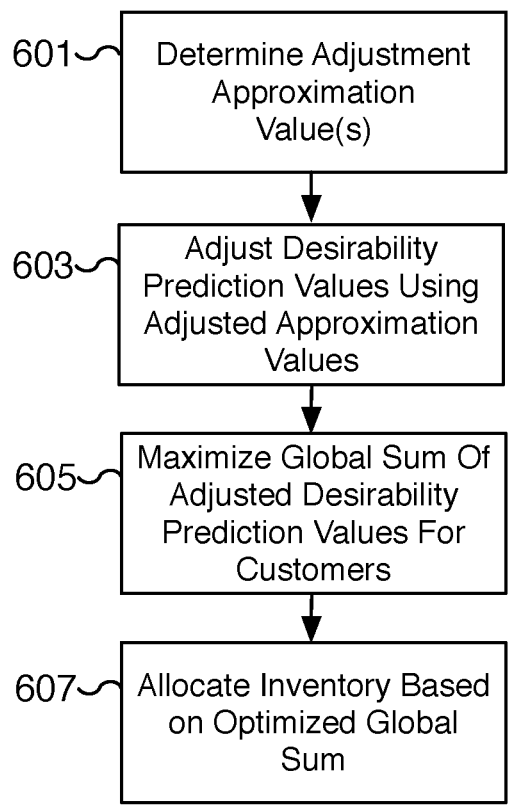
FIG. 6 is a flow chart illustrating an embodiment of a process for performing global optimization of inventory allocation using adjustment approximation values.

FIG. 6 is a flow chart illustrating an embodiment of a process for performing global optimization of inventory allocation using adjustment approximation values. The process of FIG. 6 may be at least in part implemented on one or more components of system 300 shown in FIG. 3. In some embodiments, the process of FIG. 6 is performed by processor 201 of FIG. 2. In some embodiments, one or more models trained using the process of FIG. 4 are utilized by the process of FIG. 6 for the global optimization of inventory. In some embodiments, the process of FIG. 6 is used at 505 of FIG. 5 to determine a globally optimized allocation of inventory using adjustment approximation values. Using the process of FIG. 6 increases the performance and efficiency in determining allocation across large customer groups and/or with large inventories.

At 601, adjustment approximation values are determined. For example, one or more adjustment approximation values are introduced to the global optimization problem as Lagrange multipliers and the global optimization problem can be solved using Lagrangian relaxation. In some embodiments, the global optimization problem of FIG. 5 is solved by introducing adjustment approximation values corresponding to Lagrange multipliers $\lambda$ and $\eta$. For example, the fixed vectors $\lambda$ and $\eta$ are Lagrange multipliers and are introduced as approximation adjustment values. The multiplier $\lambda_j$ can be interpreted as an adjustment value that is applied to a customer i to have access to product (or article type) j. The multiplier $\eta_i$ can be interpreted as a customer-specific adjustment value that reflects the other choices available to customer i. In some embodiments, the multiplier may be interpreted as an adjustment parameter to allow each customer a "budget" to apply towards H items. Using the introduced Lagrange multipliers $\lambda$ and $\eta$, the global optimization problem can be described as:

$$\underset{x}{\text{maximize}} \sum_{ij} p_{ij} \cdot x_{ij} - \sum_j \lambda_j \left( \sum_i x_{ij} - q_j \right) - \sum_i \eta_i \left( \sum_j x_{ij} - H \right)$$

subject to constraints:

$$\sum_j \omega_{ij} \cdot x_{ij} \geq Q \text{ where } i = 1, \ldots, N$$

$$x_{ij} \in \{0, 1\}.$$

At 601, the optimal values for the adjustment approximation values are determined. For example, optimal values for $\lambda$ and $\eta$ are selected to approximate one or more global constraints. In some embodiments, the adjustment approximation values are selected at intervals (e.g., once a week) and are treated as values that vary slowly over time. By reducing the number of times the adjustment approximation values need to be selected, the problem size is significantly reduced and the global optimization is performed more efficiently. In some embodiments, the values can be selected more frequently to improve the accuracy of the approximation.

At 603, adjusted desirability prediction values are determined using the adjusted approximation values selected at 601. In some embodiments, adjusted desirability prediction values $\tilde{p}_{ij}$ are determined that correspond to the desirability prediction values adjusted by the adjustment approximation values. For example, the adjusted desirability prediction values can be described as $\tilde{p}_{ij} = p_{ij} - \lambda_j - \eta_i$. In various embodiments, the desirability prediction values $p_{ij}$ are determined at

501 of FIG. 5. For example, the desirability prediction values $p_{ij}$ for a particular customer i and article type j can be determined by applying a trained machine learning model to predict the likelihood customer i will purchase a particular product or article type j. Using desirability prediction values $p_{ij}$, adjusted desirability prediction values $\tilde{p}_{ij}$ are determined for each customer and product pair.

At 605, the global sum of the adjusted desirability prediction values for customers is maximized. Using the selected adjustment approximation values, the global optimization problem of FIG. 5 is approximated with Lagrange multipliers $\lambda$ and $\eta$ and can be expressed in terms of adjusted desirability prediction values $\tilde{p}_{ij}$. Using adjusted desirability prediction values $\tilde{p}_{ij}$, the global optimization problem can be described as:

$$\underset{x}{\text{maximize}} \sum_{ij} \tilde{p}_{ij} \cdot x_{ij}$$

subject to constraints:

$$\sum_{j} \omega_{ij} \cdot x_{ij} \geq Q \text{ where } i = 1, \ldots, N$$

$$x_{ij} \in \{0, 1\}.$$

In various embodiments, the introduction of adjustment approximation values allows the global optimization problem to be decoupled across customers. By introducing adjustment values as Lagrange multipliers $\lambda$ and $\eta$, the global optimization problem can be solved by solving N separate optimization problems customer by customer. For each customer, an allocation vector x is solved that specifies whether the product (or article type) is allocated to the particular customer. The decoupled inventory allocation problems can be described as:

$$\underset{x_i}{\text{maximize}} \sum_{ij} \tilde{p}_{ij} \cdot x_{ij}$$

subject to constraints:

$$\sum_{j} \omega_{ij} \cdot x_{ij} \geq Q$$

$$x_{ij} \in \{0, 1\}.$$

By decoupling the problem across customers, the problem size is dramatically decreased. As described above, the problem can be further simplified by dropping one or more constraints. For example, in the event computing resources are very limited, the minimum viable assortment constraint and/or the number of product types constraints may be dropped. In some embodiments, the weights $\omega_1$ can be set to 1 to reduce the complexity required by the minimum viable assortment constraint.

At 607, inventory is allocated to customers based on the allocation corresponding to the maximized global sum of the adjusted desirability prediction values. For example, the allocation vectors $x_i$ specify which article types are allocated for customer i. For any given $x_{ij}$, where $x_{ij}=1$, the item of article type j is allocated to customer i. In some embodiments, the allocation of inventory is provided to a stylist as product options to determine a set of product selections. The product selections are then provided to the customer as product purchase suggestions. Using the inventory allocation associated with the maximized global sum from 605 allows inventory to be allocated across a group of customers in a manner that optimizes the desirability of the product suggestions across an entire group instead of maximizing individual customers at the expense of others.

FIG. 7 is a pseudo-code description illustrating an embodiment of a process for selecting adjustment approximation values. Using the process of FIG. 7, optimal adjustment approximation values $\lambda$ and $\eta$ can be selected for optimizing global inventory allocation. In some embodiments, the process described by FIG. 7 is performed at 601 of FIG. 6. In some embodiments, the selection of Lagrange multipliers $\lambda$ and $\eta$ is a dual problem that can be solved iteratively using a step size $\Delta$. For example, by computing K iterations, the process of FIG. 7 approximates optimal values for $\lambda$ and $\eta$ for N clients and M article types of inventory S. As shown in the example, the initial values of $\lambda$ and $\eta$ for the first iteration can be initialized to 0, such that $\lambda_j^{(0)}=0$ and $\eta_j^{(0)}=0$. For each iteration k, the global optimization problem of FIG. 6 is solved using $\lambda^{(k)}$ and $\eta^{(k)}$ to obtain $x_{ij}^{(k+1)}$. Once $x_{ij}^{(k+1)}$ is solved, $\eta_i^{(k+1)}$ is solved using $\eta_i^{(k)}$ and $x_{ij}^{(k+1)}$. Similarly, $\lambda_j^{(k+1)}$ is solved using $\lambda_j^{(k)}$ and $x_{ij}^{(k+1)}$. In various embodiments, the number of iterations computed K can be increased for improved accuracy. In various embodiments, the number of iterations K is determined by balancing the tradeoffs between computational resources, time, and accuracy, among other factors.

FIG. 8 is a pseudo-code description illustrating an embodiment of a process for selecting adjustment approximation values. Using the process of FIG. 8, optimal adjustment approximation values $\lambda$ and $\eta$ can be selected for optimizing global inventory allocation without a minimum viable assortment constraint. In some embodiments, the process described by FIG. 8 is performed at 601 of FIG. 6. In some embodiments, the selection of Lagrange multipliers $\lambda$ and $\eta$ is a dual problem that can be solved iteratively using a step size $\Delta$. For example, by computing K iterations, the process of FIG. 8 approximates optimal values for $\lambda$ and $\eta$ for N clients and M article types of inventory S. As shown in the example, the initial values of $\lambda$ and $\eta$ for the first iteration can be initialized to 0, such that $\lambda_j^{(0)}0$ and $\eta_j^{(0)}0$. For each iteration k, $\lambda_j^{(k+1)}$ is solved using $\lambda_j^{(k)}$ and $\eta_i^{(k)}$. Once $\lambda_j^{(k+1)}$ is solved, $\eta_i^{(k+1)}$ is solved using $\lambda_j^{(k+1)}$ and $\eta_i^{(k)}$. In various embodiments, the number of iterations computed K can be increased for improved accuracy. In various embodiments, the number of iterations K is determined by balancing the tradeoffs between computational resources, time, and accuracy, among other factors.

FIG. 9 is a pseudo-code description illustrating an embodiment of a process for selecting adjustment approximation values. Using the process of FIG. 9, optimal adjustment approximation value $\lambda$ can be selected for optimizing global inventory allocation without a constraint placed on the customer article type count. Since there is no constraint on the exact number of article types made available to each customer, there are no corresponding $\eta$ adjustment approximation values and a variable number of items are made available to different customers. In some embodiments, the process described by FIG. 9 is performed at 601 of FIG. 6. In some embodiments, the selection of Lagrange multiplier $\lambda$ can be solved iteratively using a step size $\Delta$. For example, by computing K iterations, the process of FIG. 9 approximates optimal values for λ for N clients and M article types of inventory S. As shown in the example, the initial values of λ for the first iteration can be initialized to 0, such that $\lambda_j^{(0)}=0$. For each iteration k, the global optimization problem of FIG. 6 with the dropped customer article type count constraint is solved using $\lambda^{(k)}$ to obtain $x_i^{(k+1)}$. Once $x_i^{(k+1)}$ is solved, $\lambda_j^{(k+1)}$ is solved using $\lambda_j^{(k)}$ and $x_{ij}^{(k+1)}$. In various embodiments, the number of iterations computed K can be increased for improved accuracy. In various embodiments, the number of iterations K is determined by balancing the tradeoffs between computational resources, time, and accuracy, among other factors.

In some embodiments, the processes of FIGS. 7, 8, and/or 9 are performed on a subset of clients to determine optimal adjustment approximation values λ and η for the complete inventory and a subset of selected clients. The determined approximation values are then used to infer optimal adjustment approximation values η for additional clients not part of the original selected subset. By first determining the optimal approximation values for a subset of selected clients and then using the results to infer approximation values for additional clients, the computational complexity is significantly reduced and allows the optimization of inventory to be computed even more efficiently and with even fewer computing resources. For example, the process of FIG. 8 may be performed to determine optimal adjustment approximation values λ and η for the complete inventory and a subset of selected clients. Once the optimal adjustment approximation values λ and η for the complete inventory and a subset of selected clients are determined, optimal adjustment approximation values η are inferred for other clients not originally selected. The ability to infer the optimal adjustment approximation values η for additional clients using the results of the process of FIG. 8 allows for global optimization across a much number of clients.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    predetermining, by one or more processors, a corresponding article type adjustment approximation value for each physical article type of a plurality of physical article types of limited quantities, wherein the corresponding article type adjustment approximate value indicates a relative demand value of the corresponding physical article type for current customers;
    predetermining, by the one or more processors, a corresponding client adjustment approximation value for each client of a set of clients, wherein the corresponding client adjustment approximation value indicates a measure of service quality for each client of the set of clients is being served by a current inventory;
    determining, by the one or more processors, to assign to a selected client among the set of clients, a set of physical article types among the plurality of physical article types;
    training, by the one or more processors, a plurality of machine learning prediction models, wherein each machine learning prediction model is trained using supervised learning on one or more training datasets associated with eligible physical article types included in a group identified based on one or more constraints for the selected client, wherein the one or more constraints include a constraint that indicates a number of product types to make available for the selected client or a minimum viable assortment constraint for the selected client, wherein the one or more constraints for the selected client are relaxed to identify the group of eligible physical article types;
    executing, by the one or more processors, the plurality of trained machine learning prediction models by determining a corresponding desirability prediction value for each physical article type in the group of eligible physical article types, wherein the corresponding desirability prediction value indicates a likelihood that the selected client will retain a physical article to which the corresponding desirability prediction value is associated;
    adjusting, by the one or more processors, each of the trained machine learning prediction models, where each of the trained machine learning prediction models utilize the corresponding predetermined article type adjustment approximation value and the corresponding predetermined client adjustment approximation value to determine corresponding adjusted prediction values, wherein one of the corresponding predetermined article type adjustment approximation values or the corresponding predetermined client adjustment approximation values is relaxed to improve a speed for determining the set of physical article types to be assigned to the selected client; and
    updating the one or more training datasets, by the one or more processors, wherein each of the trained machine learning prediction models provides feedback to adjust the corresponding desirability prediction value for at least one physical article type in the group of eligible physical article types.

2. The method of claim 1, wherein the set of clients are clients identified as eligible for physical article allocation within a threshold time period.

3. The method of claim 1, wherein each of the physical article types corresponds to a unique combination of a garment style and a size for the garment style.

4. The method of claim 1, wherein the corresponding predetermined article type adjustment approximation value and the corresponding predetermined client adjustment approximation value are Lagrange multipliers.

5. The method of claim 1, wherein one or more features of the machine learning prediction models are associated with a sizing and a style preference.

6. The method of claim 1, wherein the one or more training data sets utilize sales history, product retention history, and customer provided feedback.

7. The method of claim 6, wherein the customer provided feedback includes style, sizing, and fit feedback.

8. The method of claim 1, further comprising:
    identifying, based on the corresponding article type adjustment approximation values, one or more physical article types that are in demand; and
    increasing an inventory count of the identified one or more physical article types in demand.

9. The method of claim 1, further comprising identifying, based on the corresponding client adjustment approximation values, a group of one or more clients in the set of clients that are served in a more limited manner by the plurality of physical article types of limited quantities as compared to another group of clients in the set of clients.

10. The method of claim 1, wherein the plurality of physical article types of limited quantities corresponds to an inventory covering a threshold time period.

11. The method of claim 1, wherein the corresponding predetermined article type adjustment approximation values and the corresponding predetermined client adjustment approximation values are selected at a periodic interval.

12. The method of claim 1, wherein the corresponding predetermined article type adjustment approximation values and the corresponding predetermined client adjustment approximation values are selected by performing an iterative sub-gradient process.

13. The method of claim 1, wherein the set of physical article types to be assigned to the selected client is subject to the minimum viable assortment constraint.

14. The method of claim 1, further comprising:
providing to a reviewer, a listing of physical items based on the determined set of physical article types assigned to the selected client;
receiving from the reviewer an identification of a subset of one or more physical items, among the listing of physical items, to be provided to the selected client; and
providing the identified subset of the one or more physical items to the selected client.

15. The method of claim 14, further comprising:
receiving a feedback regarding the one or more provided physical items and using the feedback to adjust the desirability prediction value for at least one physical article type in the group of eligible physical article types.

16. A computer program product, the computer program product being embodied in a non-transitory computer readable storage medium and comprising computer instructions for:
predetermining, by one or more processors, a corresponding article type adjustment approximation value for each physical article type of a plurality of physical article types of limited quantities, wherein the corresponding article type adjustment approximate value indicates a relative demand value of the corresponding physical article type for current customers;
predetermining, by the one or more processors, a corresponding client adjustment approximation value for each client of a set of clients, wherein the corresponding client adjustment approximation value indicates a measure of service quality for each client of the set of clients is being served by a current inventory;
determining, by the one or more processors, to assign to a selected client among the set of clients, a set of physical article types among the plurality of physical article types;
training, by the one or more processors, a plurality of machine learning prediction models, wherein each machine learning prediction model is trained using supervised learning on one or more training datasets associated with eligible physical article types included in a group identified based on one or more constraints for the selected client, wherein the one or more constraints include a constraint that indicates a number of product types to make available for the selected client or a minimum viable assortment constraint for the selected client, wherein the one or more constraints for the selected client are relaxed to identify the group of eligible physical article types;
executing, by the one or more processors, the plurality of trained machine learning prediction models by determining a corresponding desirability prediction value for each physical article type in the group of eligible physical article types, wherein the corresponding desirability prediction value indicates a likelihood that the selected client will retain a physical article to which the corresponding desirability prediction value is associated;
adjusting, by the one or more processors, each of the trained machine learning prediction models, where each of the trained machine learning prediction models utilize the corresponding predetermined article type adjustment approximation value and the corresponding predetermined client adjustment approximation value to determine corresponding adjusted prediction values, wherein one of the corresponding predetermined article type adjustment approximation values or the corresponding predetermined client adjustment approximation values is relaxed to improve a speed for determining the set of physical article types to be assigned to the selected client; and
updating the one or more training datasets, by the one or more processors, wherein each of the trained machine learning prediction models provides feedback to adjust the corresponding desirability prediction value for at least one physical article type in the group of eligible physical article types.

17. A system, comprising:
one or more processors; and
a memory coupled with the one or more processors, wherein the memory is configured to provide the one or more processors with instructions which when executed cause the one or more processors to:
predetermine a corresponding article type adjustment approximation value for each physical article type of a plurality of physical article types of limited quantities, wherein the corresponding article type adjustment approximate value indicates a relative demand value of the corresponding physical article type for current customers;
predetermine a corresponding client adjustment approximation value for each client of a set of clients, wherein the corresponding client adjustment approximation value indicates a measure of service quality for each client of the set of clients is being served by a current inventory;
determine to assign to a selected client among the set of clients a set of physical article types among the plurality of physical article types;
train a plurality of machine learning prediction models, wherein each machine learning prediction model is trained using supervised learning on one or more training datasets associated with eligible physical article types included in a group identified based on one or more constraints for the selected client, wherein the one or more constraints include a constraint that indicates a number of product types to make available for the selected client or a minimum viable assortment constraint for the selected client, wherein the one or more constraints for the selected client are relaxed to identify the group of eligible physical article types;
execute the plurality of trained machine learning prediction models by determining a corresponding desirability prediction value for each physical article type in the group of eligible physical article types, wherein the corresponding desirability prediction value indicates a likelihood that the selected client will retain a physical article to which the corresponding desirability prediction value is associated;
adjust each of the trained machine learning prediction models, where each of the trained machine learning prediction models utilize the corresponding predetermined article type adjustment approximation value and the corresponding predetermined client adjustment approximation value to determine corresponding adjusted prediction values, wherein one of the corresponding predetermined article type adjustment approximation values or the corresponding predetermined client adjustment approximation values is relaxed to improve a speed for determining the set of physical article types to be assigned to the selected client; and update the one or more training datasets, wherein each of the trained machine learning prediction models provides feedback to adjust the corresponding desirability prediction value for at least one physical article type in the group of eligible physical article types.

* * * * *